(12) United States Patent
Lee et al.

(10) Patent No.: US 8,223,296 B2
(45) Date of Patent: Jul. 17, 2012

(54) BACKLIGHT UNIT AND LIQUID CRYSTAL DISPLAY DEVICE HAVING THE SAME

(75) Inventors: Sun Hwa Lee, Paju-si (KR); Moon Sik Kang, Guri-si (KR)

(73) Assignee: LG Display Co. Ltd., Seoul (KR)

( * ) Notice: Subject to any disclaimer, the term of this patent is extended or adjusted under 35 U.S.C. 154(b) by 355 days.

(21) Appl. No.: 12/334,166

(22) Filed: Dec. 12, 2008

(65) Prior Publication Data

US 2010/0045898 A1 Feb. 25, 2010

(30) Foreign Application Priority Data

Aug. 25, 2008 (KR) .................. 10-2008-0082859
Oct. 14, 2008 (KR) .................. 10-2008-0100490

(51) Int. Cl.
*G02F 1/1335* (2006.01)
(52) U.S. Cl. ............... 349/65; 349/61; 349/62
(58) Field of Classification Search .......... 349/65, 349/68, 61
See application file for complete search history.

(56) References Cited

U.S. PATENT DOCUMENTS

| | | | | |
|---|---|---|---|---|
| 6,016,175 | A * | 1/2000 | Kim | 349/58 |
| 6,241,358 | B1 * | 6/2001 | Higuchi et al. | 362/613 |
| 6,561,663 | B2 * | 5/2003 | Adachi et al. | 362/616 |
| 6,709,122 | B2 * | 3/2004 | Adachi et al. | 362/27 |
| 6,927,812 | B2 * | 8/2005 | Cho | 349/65 |
| 7,413,330 | B2 * | 8/2008 | Furukawa | 362/600 |
| 7,458,709 | B2 * | 12/2008 | Lang et al. | 362/612 |
| 7,728,923 | B2 * | 6/2010 | Kim et al. | 349/65 |
| 7,784,986 | B2 * | 8/2010 | Adachi et al. | 362/555 |
| 7,826,698 | B1 * | 11/2010 | Meir et al. | 385/31 |
| 2001/0053072 | A1 * | 12/2001 | Takemoto | 362/31 |
| 2002/0024803 | A1 * | 2/2002 | Adachi et al. | 362/31 |
| 2003/0202363 | A1 * | 10/2003 | Adachi et al. | 362/558 |
| 2004/0174717 | A1 * | 9/2004 | Adachi et al. | 362/555 |
| 2005/0128374 | A1 * | 6/2005 | Furukawa | 349/56 |
| 2005/0168967 | A1 * | 8/2005 | Kao et al. | 362/27 |
| 2006/0221610 | A1 * | 10/2006 | Chew et al. | 362/247 |
| 2006/0221638 | A1 * | 10/2006 | Chew et al. | 362/613 |
| 2007/0058393 | A1 * | 3/2007 | Kim et al. | 362/613 |
| 2008/0205080 | A1 * | 8/2008 | Erchak et al. | 362/613 |
| 2008/0231774 | A1 * | 9/2008 | Tomita et al. | 349/66 |
| 2009/0207629 | A1 * | 8/2009 | Fujiyama et al. | 362/613 |
| 2009/0316074 | A1 * | 12/2009 | Tomiyoshi | 349/65 |
| 2010/0103349 | A1 * | 4/2010 | Schmidt et al. | 349/64 |
| 2010/0118562 | A1 * | 5/2010 | Kubo et al. | 362/606 |
| 2010/0214802 | A1 * | 8/2010 | Masuda et al. | 362/606 |

FOREIGN PATENT DOCUMENTS

| | | |
|---|---|---|
| CN | 1786792 | 6/2006 |
| CN | 101149519 | 3/2008 |
| CN | 101158784 | 4/2008 |

* cited by examiner

*Primary Examiner* — Rhonda Peace
(74) *Attorney, Agent, or Firm* — Brinks Hofer Gilson & Lione

(57) ABSTRACT

A backlight unit for an LCD device produces a more uniform brightness by reducing or preventing bright lines occurring at the location of each LED device. The backlight unit includes a plurality of light guide plates which are arranged to overlap with an incident portion of adjacent light guide plate to at least partially cover the LED array. Accordingly, the backlight unit can prevent the generation of bright lines and hot spots caused when the light guide plate does not cover the LED array. As a result, the LCD device may improve images of uniform brightness.

23 Claims, 12 Drawing Sheets

BACKLIGHT UNIT AND LIQUID CRYSTAL DISPLAY DEVICE HAVING THE SAME

RELATED APPLICATIONS

This application claims priority under 35 U.S.C. §119 to Korean Patent Application Nos. 10-2008-0082859 and 10-2008-0100490, filed on Aug. 25, 2008 and Oct. 14, 2008, respectively, each of which are hereby incorporated by reference in their entirety.

BACKGROUND

1. Field of the Disclosure

This disclosure relates to a liquid crystal display device with a backlight unit configured to realize a slim size and a uniform luminance.

2. Description of the Related Art

With an increase in information dispersion in society, display devices capable of displaying information have been developed. These display devices include liquid crystal display (LCD) devices, organic electro-luminescence display devices, plasma display devices, and field emission display devices. LCD devices tend to be lighter and smaller and can provide a low power drive and a full color scheme. Accordingly, LCD devices have been used for numerous applications, such as mobile phones, navigation systems, portable computers, televisions, etc.

The LCD device utilizes a backlight unit capable of irradiating light for the display as it is otherwise not luminous. The LCD device controls the transitive amount of light irradiated from the backlight unit for displaying images.

FIG. 1 is a cross sectional view showing a backlight unit of edge type according to the related art. As shown in FIG. 1, the edge type backlight unit 10 includes a fluorescent lamp 12 disposed at the side of a light guide plate 11, a reflection sheet 14 disposed under the light guide plate 11, and optical sheets 15 disposed over the light guide plate 11.

The fluorescent lamp 12 emits light that enters into the light guide plate 11. However, some of the light emitted in the fluorescent lamp 12 may not enter into the light guide plate 11 resulting in light leakage. In order to prevent or minimize the light leakage, a lamp housing 13 with reflective properties is provided to surround the fluorescent lamp 12. Accordingly, some of the light emitted from the fluorescent lamp 12 directly enters into the light guide plate 11, while the rest of light is reflected by the lamp housing 13 towards the light guide plate 11.

Light within the light guide plate 11 progresses toward the optical sheets 15 directly or by being reflected from the reflection sheet 14. The optical sheets 15 allow light to be diffused and irradiated to a liquid crystal panel (not shown) above the optical sheets 15.

FIG. 2 illustrates another backlight unit 20 of direct type that includes a reflection sheet 24 disposed on a bottom cover 23, a plurality of fluorescent lamps 22 arranged on the reflection sheet 24, and optical sheets 25 stacked over the fluorescent lamps 22. Another optical sheet 21 is disposed between the optical sheets 25 and the fluorescent lamps 22.

The edge type backlight unit, which includes the fluorescent lamp disposed at one side of the light guide plate may have display problems. A deviation in brightness may be generated between regions of the light guide plate adjacent to and remote from the fluorescent lamp. In other words, the brightness may not be uniform across the display. This problem may be worse as the size of the liquid crystal panel is increased.

In the direct type backlight unit, the shapes of the fluorescent lamps may appear on the liquid crystal panel to the viewer. To reduce the effect of the fluorescent lamps being revealed on the liquid crystal panel, the distance between the fluorescent lamps and the optical sheets may be increased. However, increasing the distance between the lamps and the optical sheets results in a backlight unit that is thicker, thereby making it more difficult to produce an LCD device that is slim.

BRIEF SUMMARY

According to one aspect, a backlight unit is disclosed that includes a bottom cover defining a plurality of luminescent regions in first and second directions perpendicular to each other. A plurality of light source modules are arranged in the plural luminescent regions. Each of the light source modules includes a light guide plate and an LED array disposed at the side of the light guide plate in a boundary region adjacent at least one of the luminescent regions. An optical sheet is disposed over the light source modules. The light source modules comprise first and second light source modules. The second light guide plate of the second light source module overlaps an incident portion of first light guide plate of the first light source module to cover a first LED array of the first light source module.

An LCD device according to another aspect includes a bottom cover defining a plurality of luminescent regions in first and second directions substantially perpendicular to each other. A plurality of light source modules are arranged in the plurality luminescent regions. Each of the light source modules includes a light guide plate and an LED array disposed at the side of the light guide plate in a boundary region adjacent at least one of the luminescent regions. An optical sheet is disposed over the light source modules. A liquid crystal panel is disposed on the optical sheet. The light source modules include first and second light source modules, and a second light guide plate of the second light source module overlaps with an incident portion of the first light guide plate of the first light source module to cover a first LED array for the first light source module.

A backlight unit according to another aspect includes a bottom cover defining a plurality of luminescent regions in first and second directions perpendicular to each other. A plurality of light source modules are arranged in the plurality of luminescent regions. Each of the light source modules includes a light guide plate and an LED array disposed at the side of the light guide plate in a boundary region adjacent at least one of the luminescent regions. An optical sheet is disposed over the light source modules. The light guide plate includes a protrusion portion that extends from the top portion of the side surface of the light guide plate adjacent to the LED device toward the second direction and covers the LED device.

An LCD device according to another aspect includes a bottom cover defining a plurality of luminescent regions in first and second directions substantially perpendicular to each other. A plurality of light source modules are arranged in the plurality of luminescent regions. Each of the light source modules includes a light guide plate and an LED array disposed at the side of the light guide plate in a boundary region adjacent at least one of the luminescent regions. An optical sheet is disposed over the light source modules, and a liquid crystal panel is disposed on the optical sheet. The light guide plate includes a protrusion portion that extends from the top portion of the side surface of the light guide plate adjacent to an LED array toward the second direction, for covering the LED array.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE DRAWINGS AND THE PRESENTLY PREFERRED EMBODIMENTS

Figure 1:
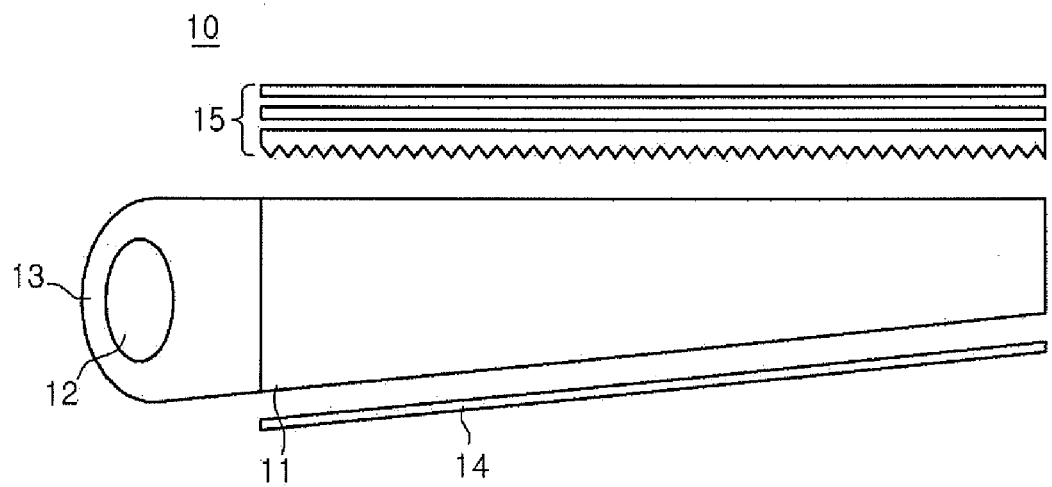
FIG. 1 is a cross sectional view showing a backlight unit of edge type according to the related art.
Figure 2:
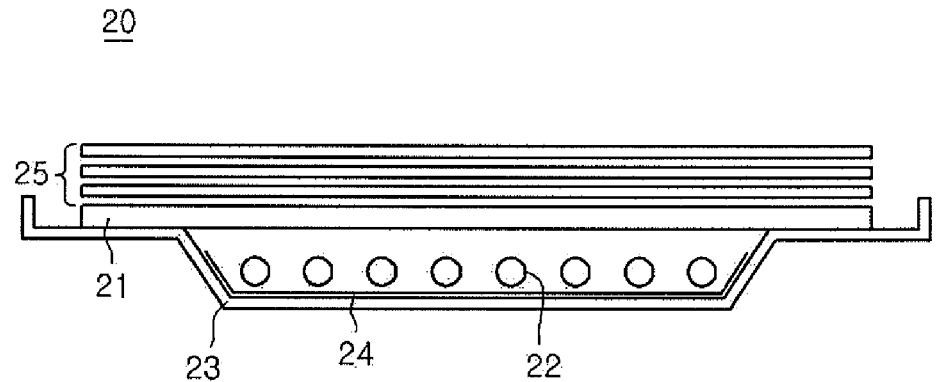
FIG. 2 is a cross sectional view showing a backlight unit of direct type according to the related art.

Reference will now be made in detail to the embodiments of the present disclosure, examples of which are illustrated in the accompanying drawings. These embodiments introduced hereinafter are exemplary as understood by the ordinary skilled person in the art. Accordingly, these embodiments may be embodied differently as understood by those of ordinary skill in the art and are not limited as described here. The size and thickness of the device may be exaggerated for the sake of convenience in the drawings. Wherever possible, the same reference numbers will be used throughout this disclosure including the drawings to refer to the same or similar parts.

Figure 3:
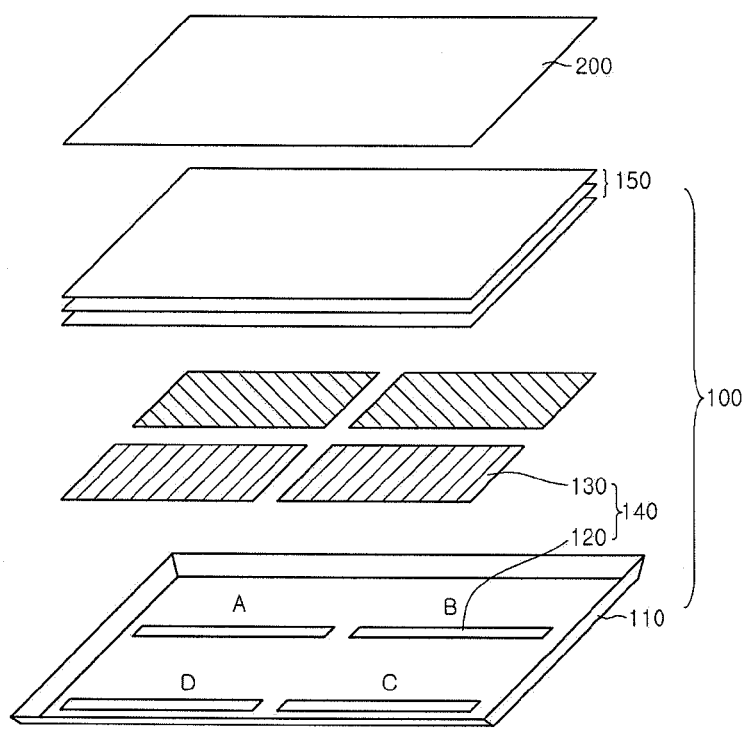
FIG. 3 is an exploded perspective view showing an LCD device according to a first embodiment.
Figure 4:
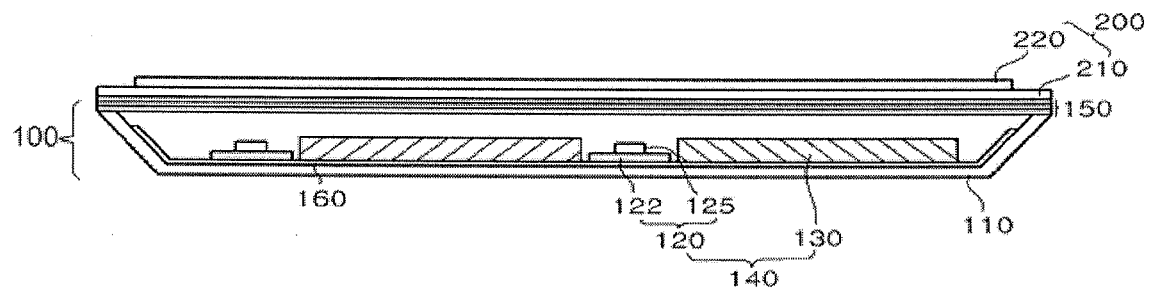
FIG. 4 is a cross sectional view showing the LCD device illustrated in FIG. 3.
Figure 5:
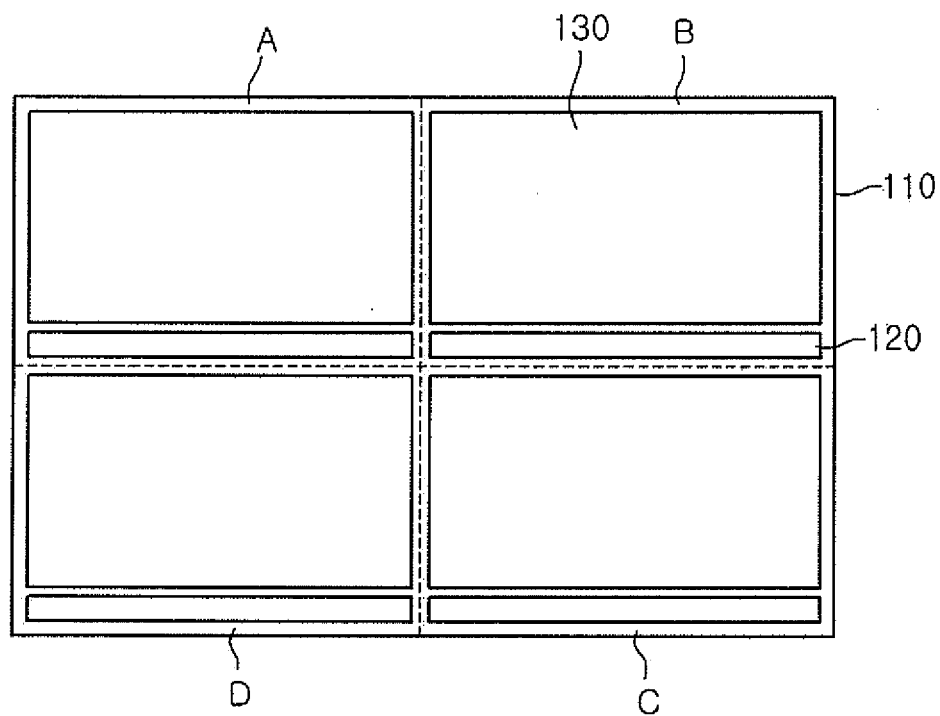
FIG. 5 is a plane view showing the LCD device illustrated in FIG. 3.
Figure 6:
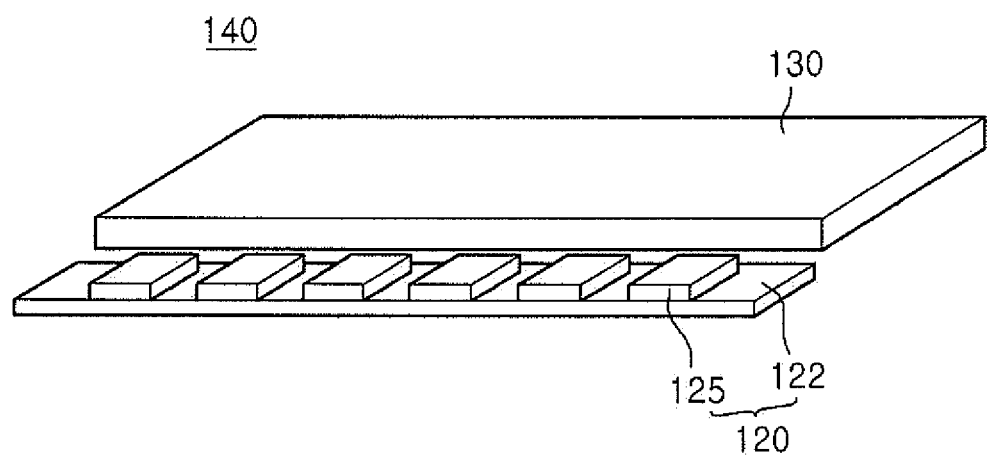
FIG. 6 is a perspective view showing a light source module included in the LCD device illustrated in FIG. 3.

FIG. 3 is an exploded perspective view showing an LCD device according to a first embodiment. FIG. 4 is a cross sectional view showing the LCD device illustrated in FIG. 3. FIG. 5 is a plane view showing the LCD device illustrated in FIG. 3. FIG. 6 is a perspective view showing a light source module included in the LCD device illustrated in FIG. 3.

Referring to FIGS. 3 and 4, the LCD device according to a first embodiment includes a backlight unit 100 and a liquid crystal panel 200. The backlight unit 100 emits light that is provided to illuminate the liquid crystal panel 200. The liquid crystal panel 200 adjusts the transmittance of the light emitted from the backlight unit 100 for displaying images.

The LCD device may also include a driver unit (not shown) that drives the liquid crystal panel 200 for controlling light transmittance. The driver unit may include a timing controller, a gate driver, and a data driver.

The timing controller receives video data and control signals which are applied from a system including a video card. The video data includes red (R), green (G), and blue (B) data. The control signals include a data enable signal EN, a data clock DcIk, a vertical synchronous signal Hsync, and a horizontal synchronous signal Hsync. Also, the timing controller derives gate control signals for driving the gate driver and data control signals for driving the data driver, from the control signals. Furthermore, the timing controller rearranges the video data into a format suitable for being displayed on the liquid crystal panel 200. The gate driver responds to the gate control signals applied from the timing controller and generates scan signals which are used for scanning respective gate lines on the liquid crystal panel 200. The data driver converts the video data applied from the timing controller into an analog video voltage, in response to the data control signals from the timing controller.

The liquid crystal panel 200 is divided into a plurality of pixel regions, which are arranged in a matrix, for displaying the red data, green data, and blue data. As shown in FIG. 4, the liquid crystal panel 200 includes a lower substrate 210, an upper substrate 220, and a liquid crystal layer (not shown) which is interposed between the lower and upper substrates 210 and 220 and is divided into a plurality of liquid crystal cells.

The lower substrate 210 may include a plurality of gate lines and a plurality of data lines crossing each other, a plurality of thin film transistors arranged in intersecting regions of the plural gate and data lines, and a plurality of pixel electrodes connected to the respective thin film transistors. The crossing of the plural gate and data lines may define pixel regions for the plurality of pixels on the lower substrate 210. Accordingly, each of the plurality of pixels may include one thin film transistor and one pixel electrode.

The upper substrate 220 includes a color filter layer, which includes a plurality of red color filters, green color filters, and blue color filters opposite to the respective pixel regions. The upper substrate 220 further includes a black matrix disposed between the color filters and a common electrode disposed on the color filter layer and the black matrix. This upper substrate 220 may be applied to the liquid crystal panel 200 in a TN (twisted nematic) mode. Alternatively, if the liquid crystal panel 200 is of an IPS (in-plane switching) mode, the color filter layer and common electrode on the upper substrate 220 may be disposed on the lower substrate 210.

In the liquid crystal panel 200, the thin film transistors connected to each of the gate lines are turned on by the scan signal applied from the gate driver. The analog data voltages applied from the data driver to the data lines are supplied to the respective pixel electrodes through the activated thin film transistors. At the same time, a common voltage of direct or alternative current is applied to the common electrode. Accordingly, liquid crystal molecules of the liquid crystal layer are realigned in accordance with an electric potential difference between the analog data voltage on the pixel electrode and the common voltage on the common electrode. As a result, the transmitting amount of the light applied from the backlight unit 100 is adjusted so that the image is displayed.

The backlight unit 100 includes a bottom cover 110, a plurality of light source modules 140, and optical sheets 150. The bottom cover 110 receives and supports the plural light source modules 140, the optical sheets 150, and the liquid crystal panel 200. Although it is not shown in the drawings, a top case which is engaged with the bottom case 110 for protecting the liquid crystal panel 200 may be further be included in the LCD device.

The bottom cover 110 includes a first portion of a flattened surface and a second portion expanded diagonally and upwardly from the edge of the first portion. The plural light source modules 140 are arranged in the first portion. The second portion may form side walls of the bottom cover 110, allowing the optical sheets 150 and liquid crystal panel 200 to be disposed on its upper surface. The liquid crystal panel 200 may be disposed in contact with or separate from the optical sheets 150. Consequently, the plural light source modules 140 disposed on the first portion of the bottom cover 110 may be separated from the optical sheets 150 disposed on the second portion of the bottom cover 110. Accordingly, light emitted from the light source modules 140 may be applied with a more uniform brightness to the optical sheets 150. Alternatively, if light emitted from the light source modules 140 is uniform, the second portion of the bottom cover 110 may be modulated to contact the light source modules 140 with the optical sheets 150.

The first portion of the bottom cover 110 may be divided into a plurality of luminescent regions A, B, C, and D in which the plural light source modules 140 can be disposed, as shown in FIG. 5. The plural light modules 140 may be arranged in a matrix shape. As shown, four light source modules 140 are disposed on the luminescent regions A to D of the bottom cover 110. In other words, a matrix of 2×2 light source modules 140 is disposed on the first portion of the bottom cover 110. For convenience of explanation, although the LCD device of the first embodiment adopts the matrix of 2×2 light source modules 140, it is not limited to this. In alternative embodiments, the matrix may include more light source modules 140 in a different matrix arrangement, such as 3×3, 4×4, 16×9, or other arrangements.

The light source modules 140 each include a light guide plate 130 and an LED (light emitting diode) array 120, as shown in FIG. 6. The LED array 120 is disposed adjacent a side surface of the light guide plate 130 and emits light. In particular, the LED array 120 may be disposed adjacent to boundary regions between the luminescent regions A to D which are defined in the bottom cover 110, respectively, as shown in FIG. 5. For example, an LED array 120 of the light source module 140 disposed on the luminescent region A may be adjacent to a boundary region between the luminescent regions A and D, and another LED array 120 of the light source module 140 disposed on the luminescent region B may be adjacent to another boundary region between the luminescent regions B and C.

The LED array 120 includes a substrate 122 that extends substantially parallel to the light guide plate 130. A plurality of LEDs 125 are mounted on the substrate 122. The LEDs 125 on the substrate 122 may be arranged apart from one another. The substrate 122 may be a printed circuit board (PCB) including metal lines arranged thereon or a metal core PCB.

The LEDs 125 can include red, green, and blue LEDs, or a plurality of white LEDs. Further, the LEDs 125 may either emit light toward its front direction (front emission mode) or emit light to the side directions (side emission mode). Although it is not shown in the drawings, if the LEDs 125 of the front emission mode are used for the LCD device of the first embodiment, a reflection member coated with a reflective material on its inner face may be disposed to surround the LEDs 125, in order to direct light emitted from the LEDs 125 into the light guide plate 130 disposed beside the LEDs 125. Conversely, when the LEDs 125 of the side emission mode are applied to the LCD device of the first embodiment, each LED 125 may be designed such that a side face of each LED 125 is opened to output the light while the rest of side faces of each LED 125 is mirror-coated to prevent or reduce the output of light in other directions. Accordingly, light emitted from the LED array 120 may enter into the light guide plate 130 and may be applied with a more uniform brightness to the optical sheets 150 by the light guide plate 130.

The optical sheets 150 can include a diffusion sheet (not shown), a prism sheet (not shown), and a protective sheet (not shown). The diffusion and prism sheets may enable light irradiated from the light guide plate 130 to the liquid crystal panel 200 to be diffused and converged. The protective sheet may be used to protect the diffusion sheet and/or the prism sheet. A reflection sheet 160 may reflect the light applied from the light guide plate 130.

In this manner, the LCD device according to a first embodiment arranges the plural light source modules 140 each having a light guide plate 130 and thus allowing light of uniform brightness to be applied from the light guide plate 130 to the optical sheets 150. Light of uniform brightness may be irradiated over the entire surface of the liquid crystal panel 200. Conversely, the LCD device of the related art supplies the first region of the light guide plate adjacent to the light source and the second region of the light guide plate remote from the light source with lights of differing brightnesses, because it includes only a single light guide plate opposite the liquid crystal panel. Particularly, when the liquid crystal panel is enlarged in size, the LCD device of the first embodiment can provide light of a more uniform brightness than that of the LCD according to the related art.

Also, since the direct type LCD device of the related art includes the plural light sources arranged at constant intervals, light of a higher brightness may be emitted in the front region of each light source and light of lower brightness is emitted in the region between the light sources. As a result, the distance between the plural optical sheets and the plural light sources is enlarged, which results in the entire direct type LCD device of the related art being increased in thickness.

The LCD device according to the first embodiment includes a plurality of light guide plates 130 applying lights of uniform brightness so that the distance between the light guide plates 130 and the optical sheets 150 is shorter. Therefore, the entire thickness of the LCD device of the first embodiment is decreased.

Figure 7:
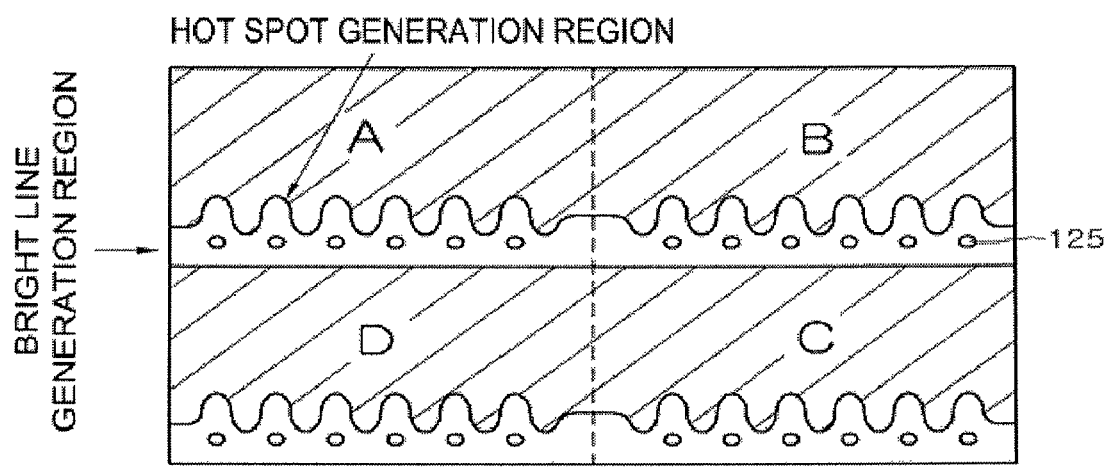
FIG. 7 is an illustration of the shapes of brightness lines and hot spots from the arrangement of light source modules illustrated in the LCD device of FIG. 3.

The LCD device according to the first embodiment generates lines brighter than the brightness by light applied from the light guide plate 130, in the lengthwise directions of the LED arrays 120 (i.e., in the lengthwise directions of the light guide plates 130) due to the LED arrays 120 arranged between the luminescent regions A, B, C, and D, as illustrated in FIG. 7. This results from the fact that the light guide plates 130 cover area that is not covered by the LED arrays 120. In order to generate light of a uniform brightness, the light guide plates 130 may be covered over all the respective luminescent regions A, B, C, and D. However, the light guide plates 130 are not arranged on the respective LED arrays 120 which are positioned adjacent to the boundary regions between the luminescent regions A, B, C, and D. Lights of differing degrees of brightness may be generated in the regions upon which the light guide plate 130 and the LED array 120 are positioned.

Since the LED array 120 is disposed separate from the light guide plate 130, a portion of the light emitted from the LED array 120 does not enter into the light guide plate 130 and is instead irradiated toward the front direction through a gap between the LED array 120 and the light guide plate 130. The brightness of light irradiated to the front direction may be higher than that of the light that passes through the light guide plate 130.

As illustrated in FIG. 7, the LCD device according to the first embodiment of the present disclosure, may produce hot spots that correspond to regions which have a brighter display. The hot spots may be caused by the plural LEDs 125 included in the LED array 120. These hot spots may result from the divergent light emitted from each LED 125. Accordingly, some regions of an incident portion of each light guide plate 130 which are directly opposite from a respective LED 125 may be relatively brighter because the incident portion is closer to the respective LED 125. Meanwhile, the rest of the regions of the incident portion of each light guide plate 130 which are opposed to spaces between the LEDs 125 may be less bright (or relatively darker) because the rest of the regions of the incident portion are remote from the LED 125. Consequently, a wave-shaped stream of hot spots is generated in the incident portion of each light guide plate 130 adjacent to the respective LED array 120, along the lengthwise direction of the LED array 120.

Other LCD devices adapted to prevent or reduce the bright lines and hot spots will now be proposed. The LCD devices of other embodiments may include some elements of the same or similar function and configuration as those of the first embodiment. Where appropriate, the same elements will be referred to in the drawings with the same numerals as those of the first embodiment and may not be described to avoid repetition.

Figure 8:
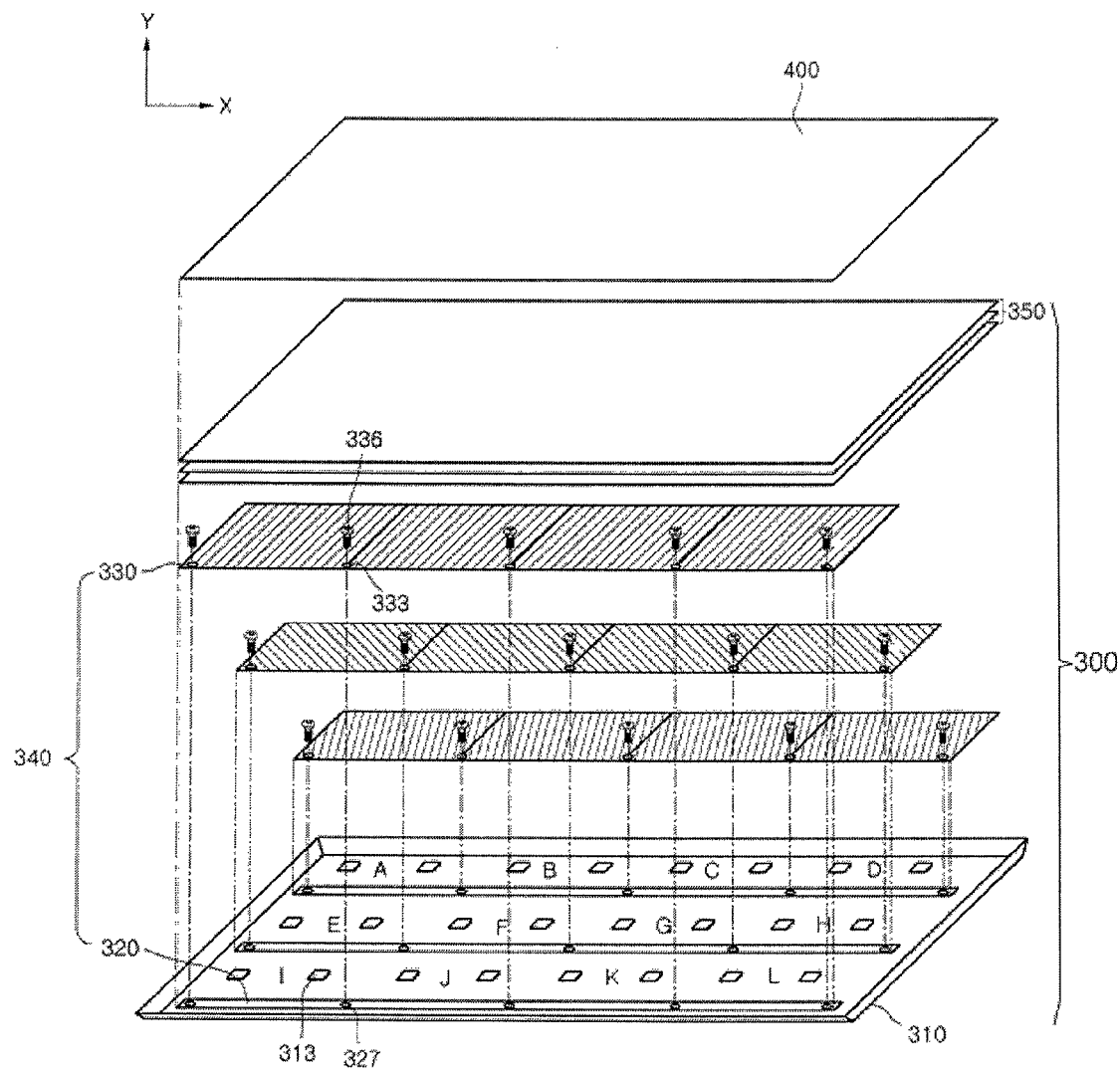
FIG. 8 is an exploded perspective view showing an LCD device according to a second embodiment.
Figure 9:
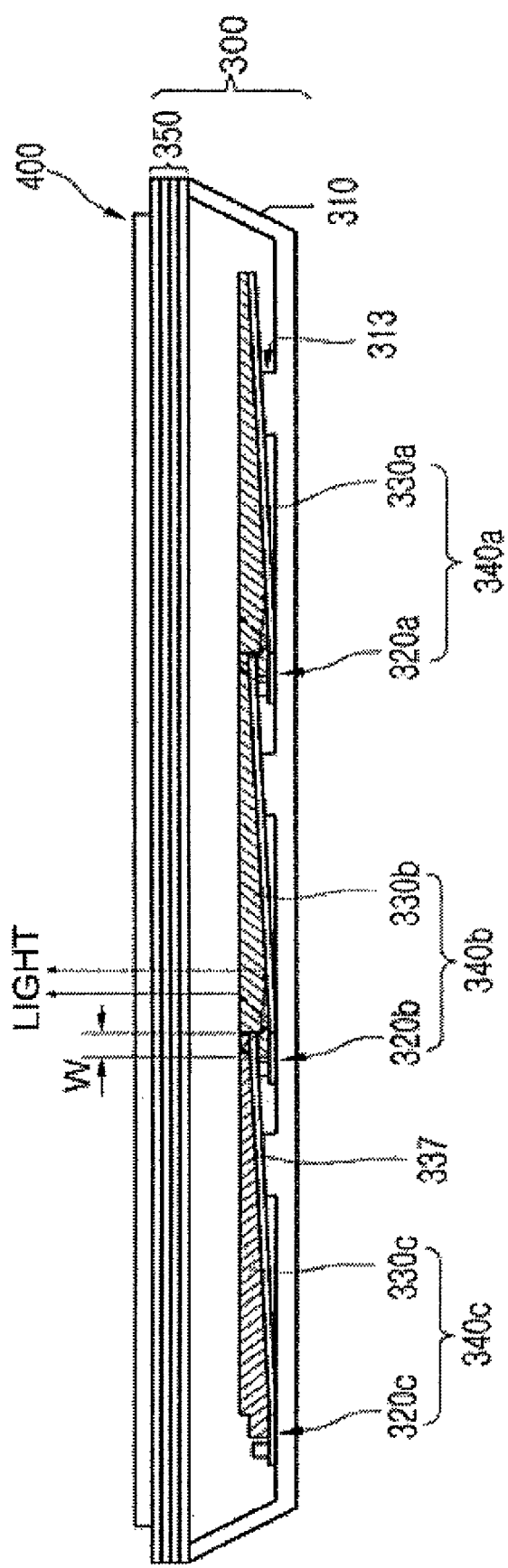
FIG. 9 is a cross sectional view showing the LCD device illustrated in FIG. 8.
Figure 10:
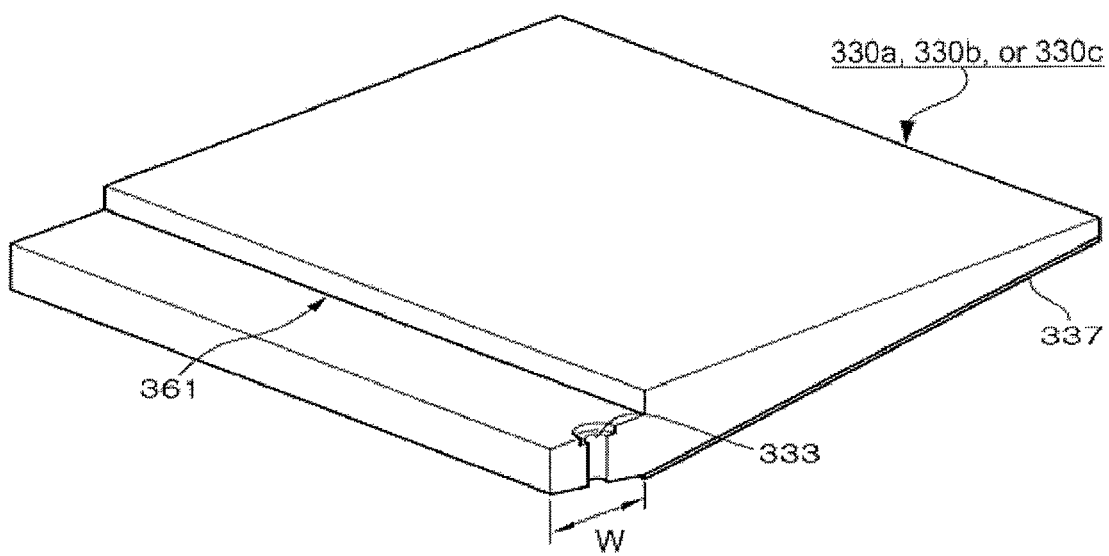
FIG. 10 is a perspective view showing a light guide plate included in the LCD device illustrated in FIG. 8.

FIG. 8 is an exploded perspective view illustrating an LCD device according to a second embodiment. FIG. 9 is a cross sectional view illustrating the LCD device of FIG. 8. FIG. 10 is a perspective view illustrating a light guide plate from the LCD device of FIG. 8.

Referring to FIGS. 8 and 9, the LCD device according to the second embodiment includes a backlight unit 300 and a liquid crystal panel 400. The backlight unit 300 includes a bottom cover 310, a plurality of light source modules 340, and optical sheets 350.

The light source modules 340 are arranged on a plurality of luminescent regions A through L which are defined on the bottom cover 310. The luminescent regions A through L can include 4 regions defined in a first direction (i.e., an x-axis direction) and 3 regions defined in a second direction (i.e., a y-axis direction). As shown, twelve luminescent regions may be defined in the bottom cover 310. Each of the light source modules 340 may include an LED array 320 and a light guide plate 330.

Similarly, twelve light guide plates 330 may be disposed in respective light guide modules 340. As shown, the light guide plates 330 are arranged by 4 in the x-axis direction and by 3 in the y-axis direction for a total of 12 light guide plates 330. This arrangement of light guide modules 340 is merely exemplary, in alternative embodiments, there may be more or fewer modules that are arranged in a different matrix.

The LED arrays 320 are arranged with a side surface of each light guide plate 330 substantially parallel to the one of the LED arrays 320. Each of the LED arrays 320 can be disposed either opposite the respective light source module 340 or may provide light to a plurality of light source modules in the x-axis direction. Also, the LED arrays 320 are positioned adjacent to boundary regions between the luminescent regions A through L.

To substantially cover the LED arrays 320, the light guide plates 330 are arranged to overlap their incident portions with the adjacent light guide plates. The incident portions may correspond to the regions where the hot spots in the LCD device of the first embodiment are generated. As shown in FIG. 9, the overlapped region (i.e., the incident portion) between the light guide plates 330 can be changed in a variety of ways, such as by modifying the width W. The width W may preferably be in a range of 3~13 mm.

The LCD device, according to the second embodiment of the present disclosure may further include reflection films 337 which are disposed on the rear surfaces of the light guide plates 330 in order to reflect lights emitted from the LED arrays 320. Each of the reflection films 337 may be a single body which is opposite the rear surfaces of the light guide plates in the x-axis direction. Also, the reflection films 337 may be disposed opposite the light guide plates 330 which are arranged in the y-axis direction. The reflection film 337 may be disposed on the region of each light guide plate 330 not including the incident portion (i.e., an interval from a start line of the incident portion to the edge line of the light guide plate 330 which is opposed to the incident portion). In other words, each reflection film 337 is disposed to cover the overlap region between the light guide plates 330.

Referring to FIG. 9, a first light source module 340a including a first LED array 320a and a first light guide plate 330a is disposed on a first luminescent region A of the bottom cover 310. A second light source module 340b including a second LED array 320b and a second light guide plate 330b is disposed on a second luminescent region E of the bottom cover 310. Furthermore, a third light source module 340c including a third LED array 320c and a third light guide plate 330c is disposed on a third luminescent region I of the bottom cover 310.

The first LED array 320a may be disposed on a boundary region between the luminescent region A and the luminescent region E. The second LED array 320b may also be disposed on a boundary region between the luminescent region E and the luminescent region I.

If the second and third light guide plates 330b and 330c are not positioned above the first and second LED arrays 320a and 320b, lines of increasing brightness may be generated. When the second light guide plate 330b is disposed to overlap with the incident portion of the first light guide plate 330a next to the first LED array 330a, the first LED array 330a is covered. Similarly, the third light plate 330c is disposed to overlap with the incident portion of the second light guide plate 330b next to the second LED array 330b, thereby covering the second LED array 330b. Moreover, the reflection films 337 may be disposed on the rear surfaces of the first to third light guide plates 330a to 330c.

Light emitted from the first and second LED arrays 320a and 320b is shielded by the reflection film 337 on the second and third light guide plates 330b and 330c from progressing toward a front direction (a direction substantially perpendicular to the upper surfaces of the light guide plates 330a to 330c). Accordingly, the generation of the bright lines can be suppressed. Light, which arise output from the upper surfaces of the incident portions of the first and second light guide plates 330a and 330b, is also shielded by the reflection films 337 on the rear surfaces of the second and third light guide plates 330b and 330c from progressing toward the front direction. Therefore, the generation of the hot spots as described above in the incident portions of the first and second light guide plates 330a and 330b can be prevented or reduced. Furthermore, since light emitted in the first to third LED arrays 320a to 320c is radiated toward the front direction through only the respective light guide plates 330a to 330c, the brightness of light output from each light guide plates 330a to 330c is made more uniform. As a result, light of uniform brightness may be irradiated to the liquid crystal panel 400.

The rear surface of each light guide plate 330a to 330c included in the LCD device of the second embodiment can have a slant shape, as illustrated in FIG. 10. Also, each light guide plate 330a to 330c (particularly, 330a or 330b) can have a cutaway portion 361 which may overlap the light guide plate 330b or 330c adjacent to its incident portion. The cutaway portion 361 may include a side surface substantially perpendicular to the bottom cover 310 and a bottom surface inclined in the same or similar slope as the rear surface of the adjacent light guide plate. For example, the incline of the first light guide plate 330a may be the same as or similar to the slope of the rear surface of the light guide plate 330b. As such, the rear surface of the light guide plate 330b or 330c can be disposed in contact with the upper surface of the adjacent light guide plate 330a or 330b, respectively. More specifically, the reflection film 337 disposed on the rear surface of the light guide plates may be in contact with the bottom surface of the cutaway portion 361 of an adjacent light guide plate. For example, the reflection film 337 disposed on the rear surface of the light guide plates 330b or 330c may contact the bottom surface of the cutaway portion 361 of the adjacent light guide plates 330a or 330b, respectively.

Referring back to FIGS. 8 and 9, the bottom cover 310 can include members 313 supporting the plural light guide plates 330a to 330c due to the sloped rear surface of the light guide plates 330a to 330c. The supporting members 313 may be formed as a single body or single structure with or separate from the bottom case 310. The supporting members 313 can also be disposed to each light guide plate 330a to 330c, in a pattern. Furthermore, the upper surface of each supporting member 313 may have the same slope and shape as the rear surface of each light guide plate 330a to 330c. Accordingly, the upper surfaces of the light guide plates 330a to 330c can maintain a uniformly horizontal level because the light guide plates 330a to 330c are supported by the supporting members 313.

The LED arrays 320a to 320c and the light guide plates 330a to 330c can be fastened onto (or attached to) the bottom cover 310. In one example, the fastening may include first through holes 333 each having a screw thread that are formed in the incident portion of each light guide plate 330a to 330c. Corresponding with the first through holes 333, second through holes 327 may be formed in the respective LED arrays 320a to 320c, such as on the substrates of the LED arrays. Similarly, third holes (not shown) may be formed corresponding with the second through holes 327 on the bottom cover 310. Screws 336 are inserted into the respective third holes on the bottom cover 310 via the respective first through holes 333 in the light guide plates 330a to 330c and the respective second through holes 327 in the LED array 320a to 320c, so that the light guide plates 330a to 330c and the LED arrays 320a to 320c can be fastened or attached to the bottom cover 310.

The light guide plates 330a to 330c further include fourth through holes (not shown) formed in the edge portion opposite the incident portion. The fourth through holes formed in the edge portions of the light guide plates 330a to 330c (may be arranged corresponding with the first through holes 333 formed in the incident portions of the adjacent light guide plates. For example, particularly, the second and third light guide plates 330b and 330c may correspond with the first through holes 333 formed in the incident portions of the light guide plates 330b and 330c, respectively. Accordingly, two light guide plates (for example, 330a and 330b) adjacent to each other can be combined by means of the screws 336 sequentially passing via the fourth through holes of one light guide plate 330b and the first through holes 333 of the other light guide plate 330a. As a result, the number of the screws 333 may be reduced.

Alternatively, the first through hole 333 can be disposed to receive the head of a screw 336 so that the head of screw 336 does not protrude from the first through hole 333. Although the adjacent light guide plates 330b and 330c overlap with the incident portions of the light guide plates 330a and 330b, these overlapped light guide plates 330b and 330c can be in close contact with the bottom surface of the cutaway portion 361 of the other light guide plates 330a and 330b without coming undone or being unfastened by means of the head of screw 336.

Figure 11:
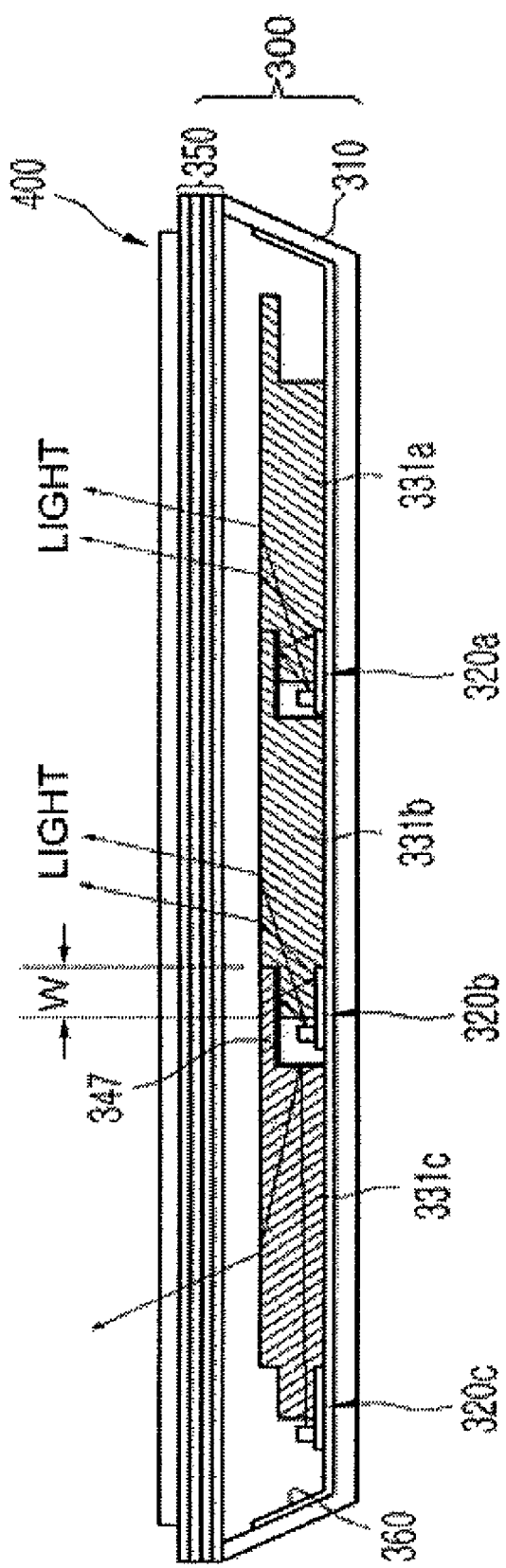
FIG. 11 is a cross sectional view showing an LCD device according to a third embodiment.
Figure 12:
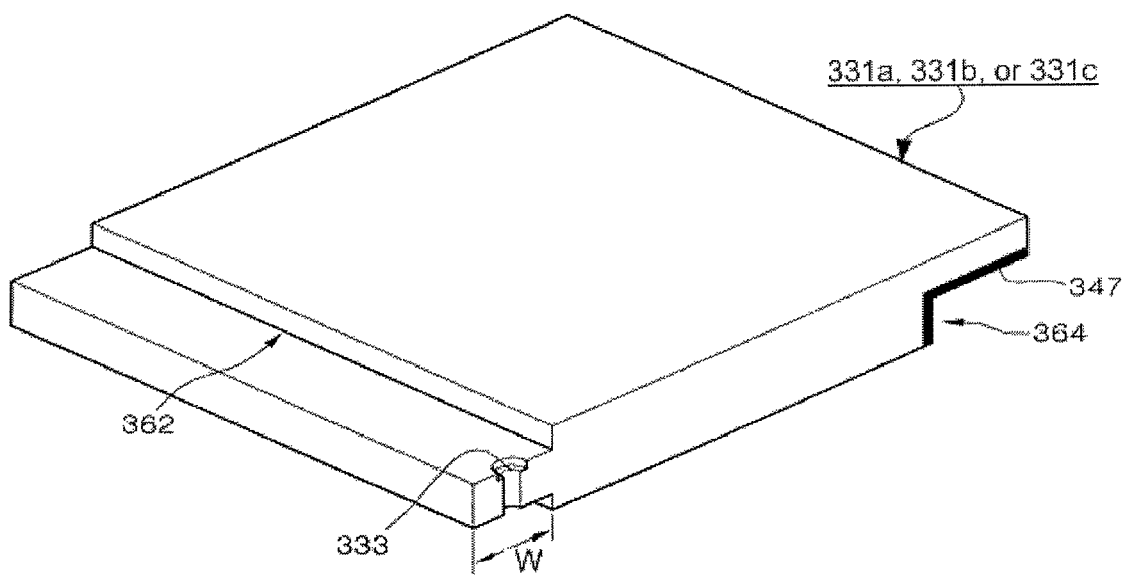
FIG. 12 is a perspective view showing a light guide plate included in the LCD device illustrated in FIG. 11.

FIG. 11 is a cross sectional view illustrating an LCD device according to a third embodiment of the present disclosure. FIG. 12 is a perspective view illustrating a light guide plate included in the LCD device of FIG. 11. The LCD device of the third embodiment has the same or similar configuration as the LCD device of the second embodiment, with the exception of differences in the structure of the light guide plates. Accordingly, the light guide plate of the LCD device of the third embodiment will be explained below.

In the LCD device according to the third embodiment of the present disclosure, light guide plates 331a to 331c each have a rear surface which is shaped similarly to the inner surface of the bottom cover 310, as shown in FIGS. 11 and 12. As illustrated, the rear surfaces of the light guide plates 331a to 331c are not sloped and correspond with the inner surface of the bottom cover 310.

The light guide plates 331a to 331c each include a first cutaway portion 362 formed on the incident portion and a second cutaway portion 364 in the edge portion of each light guide plate 331a to 331c which is opposite to the incident portion. The first cutaway portions 362 may be formed by cutting out the upper and left side edge portion of each light guide plate 331a to 331c, and the second cutaway portions 364 may be formed by cutting out the lower and right side edge portion of each light guide plate 331a to 331c. FIG. 12 illustrates one example of the cutaway portions.

On the upper and side surfaces of each second cutaway portion 364, a reflection member 347 can be disposed. This reflection member 347 can be formed by attaching a reflection film to or by directly coating a reflective material on the upper and side surfaces of the second cutaway portion of each light guide plate 331a to 331c which is opposite to the incident portion. The reflection member 347 may have both surfaces capable of reflecting light. Accordingly, light entering into each light guide plate 331a to 331c may progress and be output toward a front direction (i.e., a direction substantially perpendicular to the upper surface of the respective light guide plates 331a to 331c) through a reflection of the respective reflection member 347. Also, light entering into each light guide plate 331a to 331c may progress to an adjacent light guide plate, and may be output toward the front direction through a reflection of the reflection member 347 on the adjacent light guide plate. For example, light entering through the light guide plates 331a and 331b may progress to adjacent light guide plates 331b or 331c, respectively.

The second cutaway portions 364 of the light guide plates 331b and 331c overlap with the respective first cutaway portions 362 of the adjacent light guide plates 331a and 331b, respectively. Although the width of the overlapped region of the light guide plates 331a and 331b (or 331b and 331c) may be adjusted in a variety of types according to design specifications, the width may be in a range of 3~13 mm.

Independent of the reflection members 347, a reflection plate 360 may be disposed on the bottom cover 310. The reflection plate 360 may reflect light, which initially progresses from each light guide plate 331a to 331c in a rear direction, but is reflected toward the front direction.

The first LED array 320a may be positioned between the first and second light guide plates 331a and 331b, and the second LED array 320b may be positioned between the second and third light guide plates 331b and 331c. In other words, the first LED array 320a may be positioned under the second light guide plate 331b because the second cutaway portion 364 of the second light guide plate 331b is disposed to overlap with the first cutaway portion 362 of the first light guide plate 331a. Similarly, the second LED array 320b may also be positioned under the third light guide plate 331c because the second cutaway portion 364 of the third light guide plate 331c is disposed to overlap with the first cutaway portion 362 of the second light guide plate 331b.

Accordingly, light emitted from the first LED array 320a is reflected by the reflection member 347 which is disposed on the second cutaway portion 364 of the second light guide plate 331b. The reflected light from the first LED array 320a is reflected from progressing toward the front direction through a boundary region between the first and second light guide plates 331a and 331b. Accordingly, a nonuniform brightness may be avoided.

Light emitted from the first LED device 320a is reflected by the reflection member 347 of the second light guide plate 331b and progresses toward the region opposite to the incident region of the first light guide plate 331a before it is output to the front direction. Therefore, a greater amount of light can progresses toward the front, and the light efficiency and uniformity can be improved.

Furthermore, as the first cutaway portion 362 formed on the incident portion of the first light guide plate 331a is overlapped with the upper surface of the second cutaway portion 364 of the second light guide plate 331b in which the reflection member 347 is positioned, light output from the upper surface of the incident portion of the first light guide plate 331a is also shielded by the reflection film 347 on the upper surfaces of the second cutaway portion 364 of the second light guide plate 331b from progressing toward the front direction. Thus, the generation of hot spots in the incident portions between the first light guide plates 331a and 331b may be prevented or reduced.

The loss of light that may result from light emitted in the first LED device 320a not progressing toward the front direction via the incident portion of first light guide plate 331a may be prevented or minimized. This matter may be solved because light emitted from adjacent LED arrays is output towards the front direction via the incident portion and the overlapped portion of the adjacent light guide plate. For example, light emitted from the second LED array 331b may be output in the front direction through the second light plate 331b and towards the incident portion.

Moreover, light entering into the incident portion of the first light guide plate 331a progresses toward the surface direction by the reflection of the reflection member 347 on the second cutaway portion 364 of the second light guide plate 331b before it is output to the front direction. Accordingly, a greater amount of light can progress toward the front direction and the light efficiency can be improved.

Figure 13:
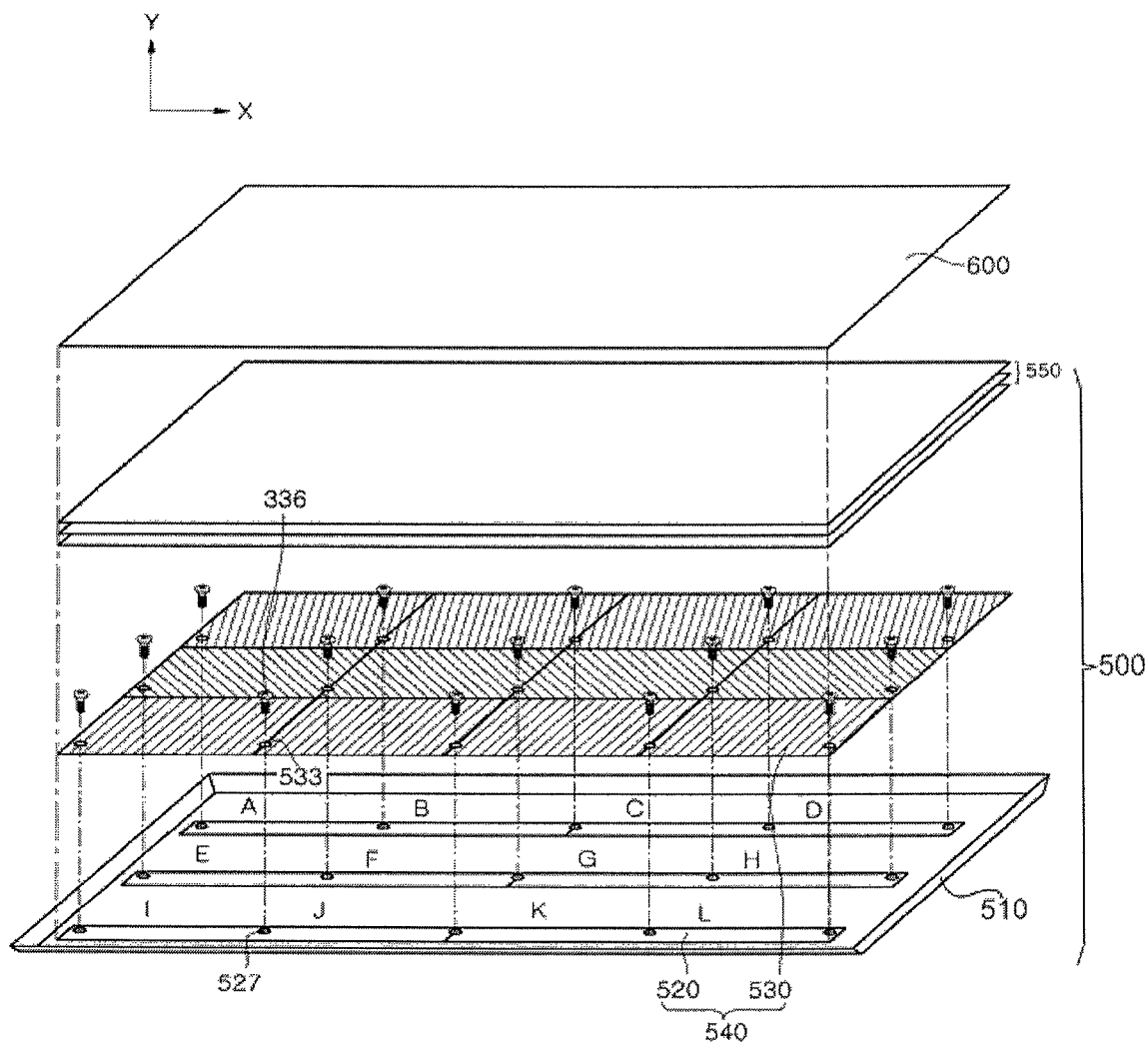
FIG. 13 is an exploded perspective view showing an LCD device according to a fourth embodiment.
Figure 14:
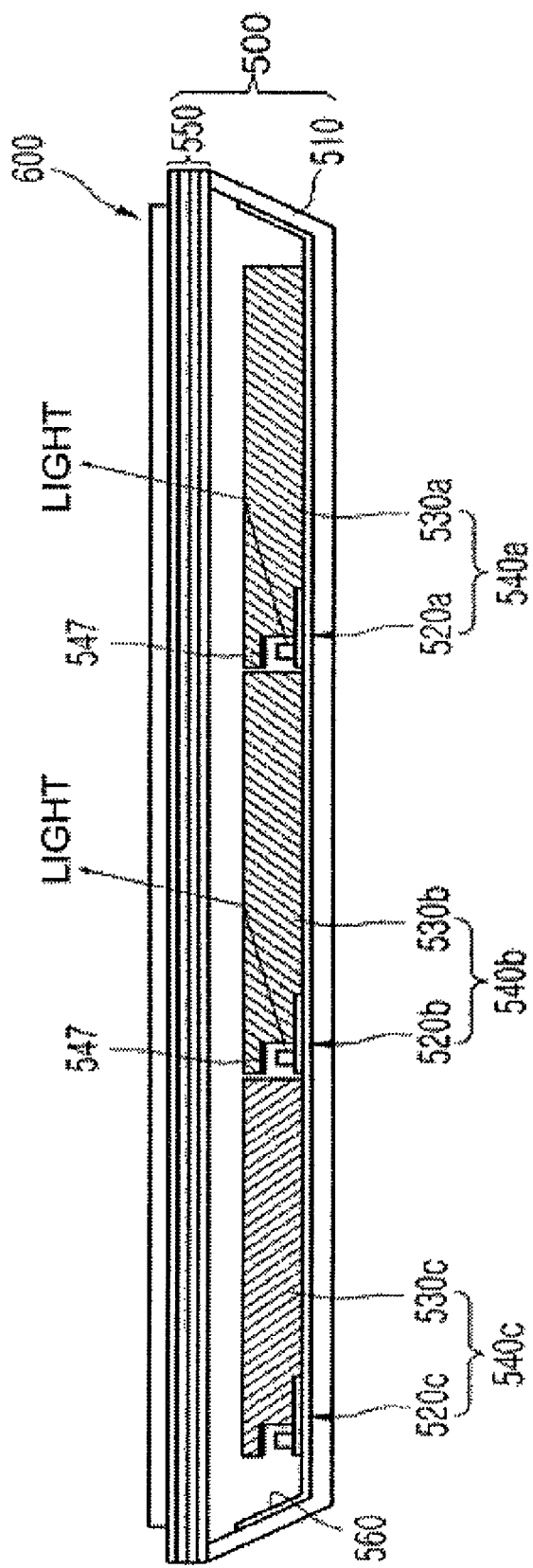
FIG. 14 is a cross sectional view showing the LCD device illustrated in FIG. 13.
Figure 15:
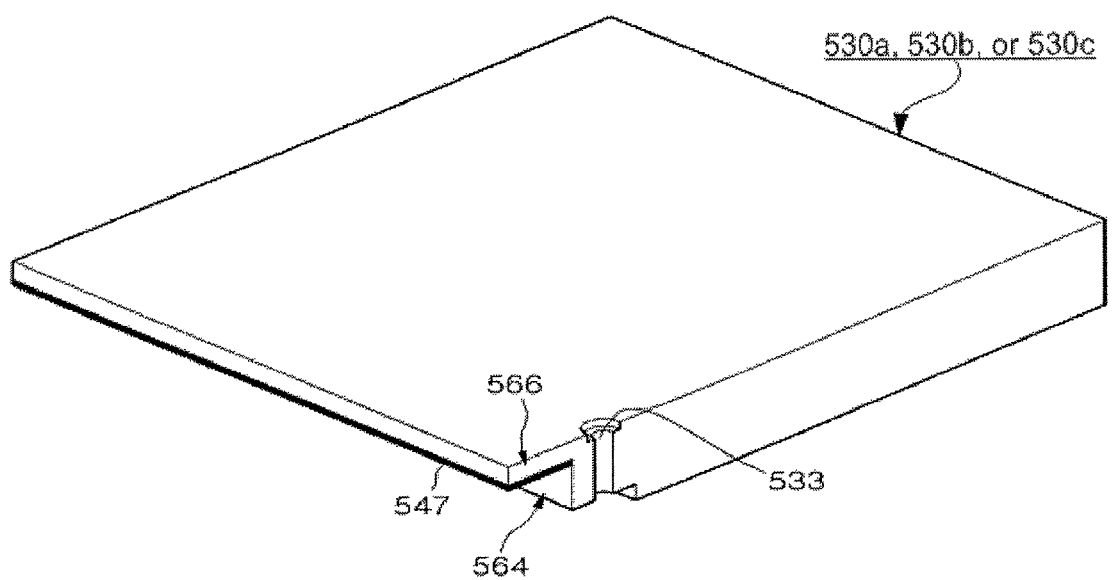
FIG. 15 is a perspective view showing a light guide plate from the LCD device illustrated in FIG. 13.

FIG. 13 is an exploded perspective view illustrating an LCD device according to a fourth embodiment. FIG. 14 is a cross sectional view illustrating the LCD device of FIG. 13. FIG. 15 is a perspective view illustrating a light guide plate included in the LCD device of FIG. 13.

Referring to FIGS. 13 and 14, the LCD device according to the fourth embodiment includes a backlight unit 500 and a liquid crystal panel 600. The backlight unit 500 includes a bottom cover 510, a plurality of light source modules 540, and optical sheets 550. The LCD device of the fourth embodiment has a similar configuration as those of the second and third embodiments with the exception of the overlapped portions of light guides. In particular, the LCD device of the fourth embodiment includes a plurality of light guide plates 530a to 530c not overlapped with one another, as shown in FIG. 14.

The light source modules 540 are arranged on a plurality of luminescent regions A through L which are defined on the bottom cover 510. The luminescent regions A through L may include 4 regions in a first direction (i.e., an x-axis direction) and 3 regions in a second direction (i.e., a y-axis direction). In other words, 12 luminescent regions can be defined in the bottom cover 510. Each of the light source modules 540 may include an LED array 520 and a light guide plate 530. The arrangement of the luminescent regions A through L is merely exemplary. In additional embodiments, there may be more or fewer luminescent regions and those regions may be arranged differently.

In one example, twelve light guide plates 530 may be included in the respective light guide modules 540. As shown, the light guide plates 530 are arranged to include 4 in the x-axis direction and 3 in the y-axis direction for a total of 12 light guide plates 530.

The LED arrays 520 are arranged adjacent a respective light guide plate 530 and substantially parallel to that light guide plate 530. Each of the LED arrays 520 can be disposed to be either opposite the respective light source module 540 or shared by a plurality of light source modules 540 of the same direction.

As shown in FIG. 14, a first light source module 540a can include a first LED array 520a and a first light guide plate 530a, a second light source module 540b can include a second LED array 520b and a second light guide plate 530b, and a third light source module 540c can also include a third LED array 520c and a third light guide plate 530c. The first LED array 520a may be disposed on a boundary region between luminescent region A and luminescent region E, and the second LED array 520b may be disposed on another boundary region between luminescent region E and luminescent region I.

The first to third light guide plates 530a to 530c have cutaway portions 564 accommodating the respective LED arrays 520a to 520c, shown in FIG. 15. The cutaway portion 564 is formed by a protrusion portion 566 which is extended from the top edge of the incident surface of each light guide plate 520a to 520c in a side direction (for example, the y-axis direction). The protrusion portions 566 may cover the respective LED arrays 520a to 520c as shown in FIG. 14.

The protrusion portion 566 of the first light guide plate 530a, extends in the y-axis direction, and is disposed either close to or in contact with the side surface of the second light guide plate 530b which is opposite the incident surface of the second light guide plate 530b, as shown in FIG. 14. Also, the protrusion portion 566 of the first light guide plate 530a may be extended to a length sufficient to cover the first LED array 520a.

The protrusion portion 566 of the second light guide plate 530b, extends in the y-axis direction, and is also disposed either close to or in contact with the side surface of the third light guide plate 530c which is opposite the incident surface of the third light guide plate 530c, as shown in FIG. 14. Also, the protrusion portion 566 of the second light guide plate 530b may be extended to a length sufficient to cover the first LED array 520b.

A reflection member 547 can be disposed on the rear surface of the protrusion portion 566 of each light guide plate 530a to 530c. The reflection member 547 shields light emitted in each LED array 520a to 520c from progressing toward a front direction and through each light guide plate 530a to 530c. The reflection member 547 can be formed by attaching a reflection film to or by directly coating a reflective material on the rear surface of the protrusion portion 566 of each light guide plate 530a to 530c. Preferably, the reflection member 547 may have both surfaces capable of reflecting light.

Accordingly, light generated in the first LED array 520a can enter into the incident surface of the first light guide plate 530a by reflecting from the reflection member 547 and can be guided toward the front direction by means of the first light guide plate 530a. Similarly, lights generated in the second and third LED arrays 520b and 520c are reflected by the respective reflection members 547 and are guided toward the front direction by means of the second and third light guide plates 530b and 530c. Accordingly, a greater amount of light can progress toward the front direction and the light efficiency can be improved.

Light emitted from the first LED array 520a is reflected by the reflection member 547 of the first light guide plate 530a. The reflection results in the light not progressing toward the front direction through the boundary region between the luminescent region A and the luminescent region E. Accordingly, the generation of bright lines and nonuniform brightness may be prevented or reduced in the boundary region between the luminescent region A and the luminescent region E. Similarly, the generation of bright lines in another boundary between the luminescent regions E and the luminescent region I may also be prevented or reduced.

Furthermore, light generated in the first LED array 520a progresses to the protrusion portion 566 by an internal reflection of the first light guide plate 530a and is output toward the front direction by another reflection of the reflection member 547 of the first light guide plate 530a, so that light applied from the boundary region between the luminescent region A and the luminescent region E may have the same or similar brightness as those from the luminescent region A and luminescent region E. In the same manner, light applied from another boundary region between the luminescent region E and the luminescent region I may also have the same or similar brightness as those from the luminescent region E and the luminescent region I. Consequently, light of near-uniform brightness can be irradiated on the liquid crystal panel 600.

The first through holes 527, and second through holes 533 are disposed respectively on the light guide plates 530a to 530c and on the LED arrays 520a to 520c. Also, third holes (not shown) may be formed on the bottom cover 510. Furthermore, fourth through holes (not shown) may also be formed on the light guide plates, as explained with reference to the second embodiment. Accordingly, the light guide plates 530a to 530c and the LED arrays 520a to 520c may be fastened to the bottom cover 510 by means of screws which are inserted into the holes via the through holes.

As described above, in the LCD devices according to the embodiments of the present disclosure, the light guide plates are arranged to overlap with one another in such a manner as to cover the intervening LED arrays therebetween, thereby shielding lights progressing from the LED devices toward the front direction by the portions of the light guide plates which are positioned over the LED arrays. Therefore, the LCD devices can prevent or reduce the generation of bright lines and produce a more uniform brightness.

Also, the LCD devices may force light entering into the incident portions of the light guide plates from being output toward the front direction of the incident portions, which may prevent the generation of hot spots.

Moreover, the LCD devices allow lights of the same or similar brightness to be output from all the light guide plates by overlapping them with one another. Accordingly, the LCD devices can irradiate light of uniform brightness on the liquid crystal panel.

It will be apparent to those skilled in the art that various modifications and variations can be made in the present disclosure. Thus, it is intended that the present disclosure cover the modifications and variations of this embodiment provided they come within the scope of the appended claims and their equivalents.

The invention claimed is:

1. A backlight unit comprising:
a bottom cover that defines a plurality of luminescent regions in first and second directions substantially perpendicular to each other;
a plurality of light guide plates disposed in the luminescent regions;
a LED array including a substrate having a flat surface parallel to the bottom cover and a plurality of LEDs on a first region of the substrate at the side surfaces of the light guide plates along the first direction; and
an optical sheet disposed over the light guide plates and the LED array,
wherein a second light guide plate of adjacent light guide plates in the second direction overlaps an incident portion of a first light guide plate of the adjacent light guide plates to substantially cover the LEDs, and wherein the substrate is fixed under incident portion of the light guide plates along the first direction, wherein only a portion of the substrate other than the first region is fixed under the incident portion of the light guide plates, and wherein the two light guide plates adjacent to each other and the substrate are fastened to the bottom cover by a screw.

2. The backlight unit according to claim 1, wherein each of the light guide plates comprises a sloped rear surface.

3. The backlight unit according to claim 2, wherein each of the light guide plates includes a cutaway portion disposed on the incident portion, wherein the cutaway portion comprises an upper and side edge portion removed from the light guide plate.

4. The backlight unit according to claim 3, wherein a portion of the second light guide plate on an opposite end to the incident portion of the second light guide plate overlaps the cutaway portion of the first guide plate on the incident portion of the first light guide plate.

5. The backlight unit according to claim 4, further comprising at least one reflection member disposed on the rear surfaces of the first and second light guide plates.

6. The backlight unit according to claim 2, further comprising support members supporting the sloped rear surface of the light guide plates, wherein the support members are disposed on the bottom cover.

7. The backlight unit according to claim 1, wherein each of the light guide plates includes a rear surface that is substantially parallel with a top surface of the light guide plate.

8. The backlight unit according to claim 7, wherein each of the light guide plates includes a first cutaway portion formed on its incident portion, wherein the first cutaway portion comprises an upper and side edge portion of the light guide plate removed, and a second cutaway portion comprises a lower and side edge portion from an end opposite to the incident portion of the light guide plate removed.

9. The backlight unit according to claim 8, wherein the second cutaway portion of the second light guide plate overlaps the first cutaway portion of the first light guide plate.

10. The backlight unit according to claim 8, further comprising reflection members disposed on side and rear surfaces of the second cutaway portion.

11. The backlight unit according to claim 7, further comprising a reflection member disposed between the bottom cover and a rear surface of the light guide plates, wherein the reflection member reflects light.

12. The backlight unit according to claim 1, wherein the fastening positions are positioned at both side edges of each light guide plate and the substrate.

13. The backlight unit according to claim 12, wherein each of the light guide plates and the substrate comprise holes for the screws.

14. The backlight unit according to claim 1, wherein the overlapped region between the first and second light guide plates comprises a width range of 3~13 mm.

15. A liquid crystal display device comprising:
a bottom cover defining a plurality of luminescent regions in first and second directions substantially perpendicular to each other;
a plurality of light guide plates disposed in the luminescent regions;
a LED array including a substrate having a flat surface parallel to the bottom cover and a plurality of LEDs on a first region of the substrate at the side surfaces of the light guide plates along the first direction; and
an optical sheet disposed over the light guide plates and the LED array; and
a liquid crystal panel disposed adjacent the optical sheet,
wherein a second light guide plate of adjacent light guide plates in the second direction overlaps an incident portion of a first light guide plate of the adjacent light guide plates to substantially cover the LEDs, and wherein the substrate is fixed under incident portion of the light guide plates along the first direction, wherein only a portion of the substrate other than the first region is fixed under the incident portion of the light guide plates, and
wherein the two light guide plates adjacent to each other and the substrate are fastened to the bottom cover by a screw.

16. A backlight unit comprising:
a bottom cover defining a plurality of luminescent regions in first and second directions substantially perpendicular to each other;
a plurality of light guide plates disposed in the luminescent regions;
a LED array including a substrate having a flat surface parallel to the bottom cover and a plurality of LEDs on the substrate at the side surfaces of the light guide plates along the first direction; and
an optical sheet disposed over the light guide plates and the LED array,
wherein the light guide plates each comprises a protrusion portion, the protrusion portion of the light guide plate extending in a side direction from a top portion of an incident surface of the light guide plate adjacent to the LEDs to cover the LEDs, and wherein the substrate is fixed under the incident surface of the light guide plates along the first direction, and
wherein the two light guide plates adjacent to each other and the substrate are fastened to the bottom cover by a screw.

17. The backlight unit according to claim 16, wherein the protrusion portion of each of the light guide plates is disposed adjacent a side surface of an adjacent light guide plate, wherein the side surface is on an end opposite to an incident surface.

18. The backlight unit according to claim 16, wherein each of the light guide plates comprises a rear surface substantially parallel with a top surface of the light guide plate.

19. The backlight unit according to claim 18, further comprising reflection members disposed on the rear surface of each protrusion portion.

20. The backlight unit according to claim 16, further comprising a reflection member that is disposed between the bottom cover and the rear surface of the light guide plates.

21. The backlight unit according to claim 16, wherein the fastening positions are positioned at both side edges of each light guide plate and the substrate.

22. The backlight unit according to claim 21, wherein each of the light guide plates and the substrate comprises holes corresponding to the fastening positions.

23. The backlight unit according to claim 16 further comprising:
a liquid crystal panel disposed over the optical sheet.

* * * * *